(12) United States Patent
St. Romain et al.

(10) Patent No.: US 11,703,335 B2
(45) Date of Patent: Jul. 18, 2023

(54) COORDINATING AND LEARNING MAPS DYNAMICALLY

(71) Applicant: Toyota Research Institute, Inc., Los Altos, CA (US)

(72) Inventors: Randall J. St. Romain, Ann Arbor, MI (US); Schuyler H. Cohen, Ann Arbor, MI (US)

(73) Assignee: Toyota Research Institute, Inc., Los Altos, CA (US)

(*) Notice: Subject to any disclaimer, the term of this patent is extended or adjusted under 35 U.S.C. 154(b) by 436 days.

(21) Appl. No.: 16/906,578

(22) Filed: Jun. 19, 2020

(65) Prior Publication Data

US 2021/0396528 A1    Dec. 23, 2021

(51) Int. Cl.
| | | |
|---|---|---|
| *G01C 21/32* | (2006.01) | |
| *G06F 16/29* | (2019.01) | |
| *G01C 21/34* | (2006.01) | |
| *G06N 20/00* | (2019.01) | |

(Continued)

(52) U.S. Cl.
CPC ......... *G01C 21/32* (2013.01); *G01C 21/3453* (2013.01); *G01C 21/3691* (2013.01); *G06F 16/23* (2019.01); *G06F 16/29* (2019.01); *G06N 20/00* (2019.01)

(58) Field of Classification Search
CPC .... G01C 21/32; G01C 21/34; G01C 21/3407; G01C 21/3415; G01C 21/343; G01C 21/3438; G01C 21/3446; G01C 21/3453; G01C 21/3476; G01C 21/3691; G01C 21/3694; G01C 21/3697; G01C 21/38; G01C 21/3804; G01C 21/3807; G01C 21/3811; G01C 21/3815; G01C 21/3492; G01C 21/3841; G06F 16/23; G06F 16/22;

(Continued)

(56) References Cited

U.S. PATENT DOCUMENTS

| | | | | |
|---|---|---|---|---|
| 8,112,219 B2 * | 2/2012 | Johnson | .................... | G08G 1/20 |
| | | | | 701/410 |
| 9,052,997 B2 * | 6/2015 | Ono | ......................... | G08G 1/16 |
| 9,255,989 B2 * | 2/2016 | Joshi | ..................... | G05D 1/0274 |

(Continued)

OTHER PUBLICATIONS

Song, et al. ; Auto-encoder Based Data Clustering ; CIARP 2013, Part I, LNCS 8258 ; pp. 117-124 ; 8 Pages.

*Primary Examiner* — Babar Sarwar
(74) *Attorney, Agent, or Firm* — Oblon, McClelland, Maier & Neustadt, L.L.P.

(57) ABSTRACT

A vehicle behavior monitor installed in a host vehicle that monitors the behavior of other vehicles. When the behavior of the other vehicles appears to deviate from an expected trajectory of an in-vehicle map, a geo-fenced region is monitored by external sensors. The external sensor data stream is input to a pre-trained anomaly detector. The clusters from the feature space of the encoder are compared to a database of known behaviors. A confidence level is determined based on the number of vehicles which exhibit the behavior. If the confidence level is equal to or greater than a confidence level threshold, a persistence value is calculate based on the type of behavior. The behavior and the persistence value are used to update the in-vehicle map. Based on the persistence value, the update is transmitted to a map server when the host vehicle enters an area of high data connectivity or is dropped.

20 Claims, 8 Drawing Sheets

(51) Int. Cl.
*G01C 21/36* (2006.01)
*G06F 16/23* (2019.01)

(58) Field of Classification Search
CPC ...... G06F 16/29; G06N 20/00; G06N 3/0445; G06N 3/0454; G06N 3/088
See application file for complete search history.

(56) References Cited

U.S. PATENT DOCUMENTS

| | | | |
|---|---|---|---|
| 9,427,874 B1 | 8/2016 | Rublee | |
| 9,437,053 B2* | 9/2016 | Jenkins | G07C 5/008 |
| 9,677,893 B2* | 6/2017 | Breed | G08G 5/0021 |
| 9,891,057 B2* | 2/2018 | Goto | G01C 21/30 |
| 10,062,281 B1* | 8/2018 | Brookins | G01C 21/3822 |
| 10,119,828 B2* | 11/2018 | Cho | G01C 21/3617 |
| 10,215,572 B2* | 2/2019 | Urano | G01C 21/3881 |
| 10,824,145 B1* | 11/2020 | Konrardy | B60P 3/12 |
| 2014/0309806 A1* | 10/2014 | Ricci | G05D 23/1917 |
| | | | 701/1 |
| 2016/0198306 A1* | 7/2016 | Miles | H04W 4/025 |
| | | | 455/456.3 |
| 2018/0245927 A1* | 8/2018 | Frish | G01S 19/49 |
| 2018/0345962 A1* | 12/2018 | Konishi | B60W 30/00 |
| 2019/0272446 A1* | 9/2019 | Kangaspunta | G06T 7/11 |
| 2019/0325602 A1 | 10/2019 | Ondruska et al. | |
| 2020/0284591 A1* | 9/2020 | Shapira | G06V 20/588 |
| 2021/0108926 A1* | 4/2021 | Tran | G01C 21/32 |
| 2021/0110484 A1* | 4/2021 | Shalev-Shwartz | B60W 10/18 |
| 2021/0312798 A1* | 10/2021 | Huang | H04W 4/029 |

* cited by examiner

COORDINATING AND LEARNING MAPS DYNAMICALLY

BACKGROUND

Technical Field

The present disclosure is directed to a vehicle computing device which monitors the behavior of surrounding vehicles to determine when vehicle map data is out of date and should be updated.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the field of autonomous and partially self-driving vehicles, accurate map data is vital to the navigation of the vehicle. Many patents and publications have described using or updating map data based on detected discrepancies between sensed road conditions and the map data.

For example, U.S. Pat. No. 10,215,572 B2, incorporated herein by reference in its entirety, describes a map update determination system which evaluates a travelling plan of a vehicle based on detected inconsistencies in the surrounding environment, such as road hazards, and updates its internal map data. The map data is sent to a map server periodically. However, this reference does not mention monitoring the behavior of other vehicles as a basis for updating the map data.

Additionally, U.S. Pat. No. 9,052,997 B2, incorporated herein by reference in its entirety, describes a host vehicle having a leading vehicle information acquisition unit which communicates with a leading vehicle, which may be a plurality of vehicles, to obtain travel speed or acceleration of the leading vehicle. The host vehicle also includes millimeter wave radar which detects the presence of the leading vehicle. The host vehicle includes road map data and identifies the travel environment of the host vehicle by referring to the road map data. Information communicated from the leading vehicle(s) is used to create probability distributions of the behavior of the leading vehicles on a preceding section of roadway in order to determine the speed or acceleration needed by the host vehicle when it arrives at the section of the roadway. However, this reference does not mention directly observing the behavior of the vehicle(s) with vehicle sensors and using the behavior to update its map data, nor sending the map data to a map data server.

Accordingly, it is one object of the present disclosure to provide a system and methods to improve the current technology in that the behavior of vehicles operating in an area is directly observed by vehicle sensors and compared to map data to determine if there is a discrepancy. If a discrepancy exists, a decision is made as to whether the map data must be updated. The computing device of performs the monitoring and updating without requiring human observation.

SUMMARY

In an exemplary embodiment, a system for updating an in-vehicle map of a host vehicle is described, the system comprising a plurality of external sensors of the host vehicle configured to monitor activities of other vehicles in a surrounding environment, a computing device having a receiver operatively connected to the first plurality of sensors, the computing device including a computer-readable medium comprising program instructions, executable by processing circuitry, to cause the processing circuitry to determine whether the activities of the other vehicles deviate from the map, geo-fence a map region in which the activities of the other vehicles deviate from the map, receive a data stream from the external sensors focused on the geo-fenced map region, analyze patterns of behavior of the activities of the other vehicles from the data stream, and determine whether to update a database of the in-vehicle map with the behavior.

In another exemplary embodiment, a method for updating an in-vehicle map of a host vehicle is described, comprising receiving data streams from a plurality of external sensors of a host vehicle, processing, using processing circuitry, the data streams to monitor the activities of other vehicles, determining whether the activities of the other vehicles deviate from map, geo-fencing a map region in which the activities of the other vehicles deviate from the map, receiving a data stream from the external sensors focused on the geo-fenced map region, analyzing patterns of behavior of the activities of the other vehicles from the data stream, and determining whether to update a database of the in-vehicle map with the behavior.

In another exemplary embodiment, a non-transitory computer readable medium having instructions stored therein that, when executed by one or more processors, cause the one or more processors to perform a method for updating an in-vehicle map of a host vehicle is described, comprising receiving data streams from a plurality of external sensors of a host vehicle, processing the data streams to monitor the activities of other vehicles, determining whether the activities of the other vehicles deviate from map, geo-fencing a map region in which the activities of the other vehicles deviate from the map, receiving a data stream from the external sensors focused on the geo-fenced map region, analyzing patterns of behavior of the activities of the other vehicles from the data stream, and determining whether to update a database of the in-vehicle map with the behavior.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
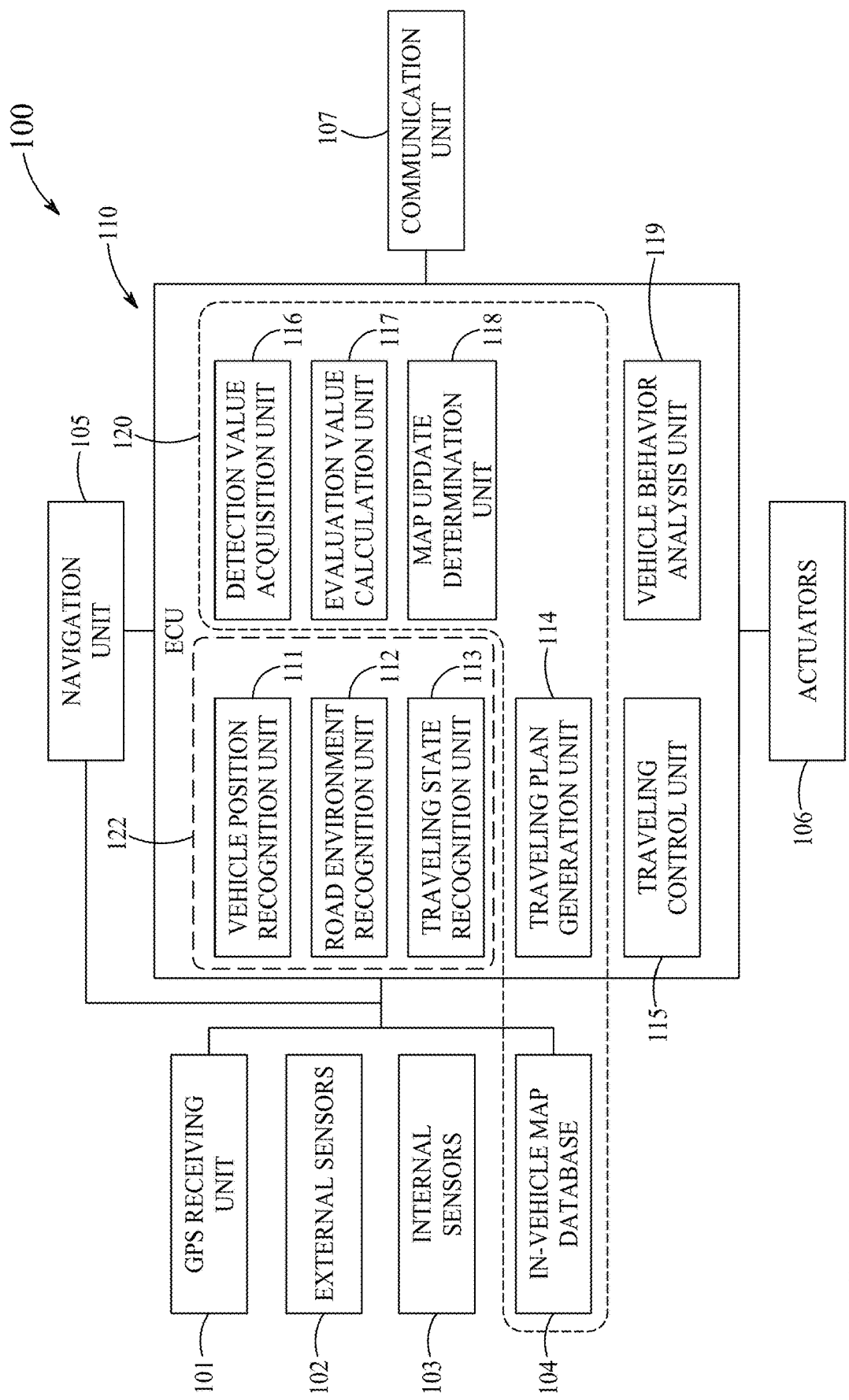
FIG. 1 is a schematic diagram of block diagram of a host vehicle computing device, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

In the present disclosure, the term "behavior" describes activity patterns of vehicles. For example, if a line of vehicles travelling on a roadway brakes suddenly when there is no stop on the trajectory, sudden braking is a behavior of the vehicles.

An autonomous vehicle is a vehicle that is capable of sensing its environment and navigating with little or no user input. A semi-autonomous vehicle is capable of sensing is environment and controlling at least some aspects of navigation, such as controlling braking, cruise control, taking control of the steering during an accident, or the like. Both autonomous and semi-autonomous vehicles sense the environment by using vehicle sensing devices such as radar, LiDAR, image sensors, and the like. Autonomous vehicles further use information from global positioning systems (GPS) technology, navigation systems, vehicle-to-vehicle (V2V) communication, vehicle-to-infrastructure technology (V2I), infrastructure-to-vehicle (V2I/I2V) communication and/or drive-by-wire systems to navigate the vehicle.

Accurate map information is required for the autonomous driving control to be performed. However, the map information may become outdated due to topographic changes (for example, potholes, construction causing changes in lane width, road curvature or the like), emergency situations (for example, accidents, animals in the roadway, oil spills, or the like), non-working traffic lights, criminal activities (for example, stolen road signs, defacing of the roadway, vandalism, or the like), closure of roadways due to flooding, icy conditions or snow at different seasons, and the like.

Aspects of the present disclosure are directed to a system and methods for updating map data based on the observed behavior of surrounding vehicles.

A map data updating system may be included in a computing device within a host vehicle that has a plurality of sensors for perceiving the environment and other vehicles around the host vehicle. The map data updating system also has access to map data regarding the environment in which the system is operating. This map data could include information regarding the presence of roads, the type of road (one way, two-way, expressway, etc.), the speed limits on the roads, turns, curves and other information.

In an aspect of the present disclosure, the host vehicle computing device uses external sensing devices, such as cameras, LiDAR and radar to monitor the external environment in which the vehicle is located. Monitoring the external environment can include receiving sensor data which includes information regarding the external environment and including the image data on the map to generate a global view of the external environment. The map can be linked to a GPS receiving unit and include GPS data.

The host vehicle computing device is able to gather information regarding the behavior of other vehicles in the environment and compare the behavior to the map data. The host vehicle computing device is able to determine if a map is unavailable or out-of-date by observing the behavior of the other vehicles at a location within the map.

In a non-limiting example, if the map indicates that the speed limit on a stretch of road is 25 mph, but other vehicles are traveling on the stretch of road travel at a speed of 55 mph, a determination could be made that the map data is out of date and should be updated. The map could be updated with the information collected from the observation of the behavior of the other vehicles. A map synchronized with observation of discrepancies in the roadway and the observation of other vehicles is called a cognitive map. A confidence interval could be generated as more and more other vehicles exhibit similar activity patterns as they travel in that area of the cognitive map. A confidence interval refers to a normalized distribution of observations where the effective bandwidth is determined at a specific percentage plus or minus the error. A confidence level is the specific percentage which is deemed correct. For example if the confidence level must be at least 97% with a 2% margin of error, the confidence interval is 99−95=4.

The map data updating system is installed in the host vehicle. Vehicle sensors collect information regarding the surrounding environment and the behavior of other vehicles, such as speed, swerving, driving on the shoulder of the roadway, sudden braking, or the like. The behavior patterns of the other vehicles are correlated with the host vehicle map data to determine if a discrepancy exists between the stored map data and the observed behavior. The system may make a decision, based on a confidence level, whether or not update the host vehicle map data. The system may retain the current map and send the discrepancy information to the remote map service. Additionally, the host vehicle may later upload the updated map data to a remote map server if the confidence level is high and the discrepancy is persistent. The remote map service may aggregate multiple, independent vehicle measurements to reach the confidence interval. The remote map service may then transmit an updated map to the vehicles.

Further, the host vehicle travelling on a roadway may update its map when a discrepancy is detected in order to navigate around the discrepancy. Alternatively, the host vehicle may follow the trajectory of another vehicle in order to navigate around the discrepancy.

The host vehicle may transmit its map to the remote map server, but the remote map may reject the update and push the original map back to the vehicle. In a non-limiting example, the discrepancy may be a downed tree occluding a lane of the roadway. The vehicle navigation system may model this situation as a map change with a borrowed lane from opposing traffic, which is a dangerous maneuver where the vehicle navigation system would need to understand that it does not have the right of way against oncoming vehicles. The map updating system may not modify the map, but instead make a trajectory plan that uses drivable surface of the roadway with knowledge that this is a dangerous state. The remote map server may receive several discrepancies from many independent vehicles until the lane is cleared and the roadway is returned back to its original state, thus this is not a persistent state which requires an update at the map server.

The host vehicle may have a plurality of sensors for assessing the activity of surrounding vehicles. The sensors may include cameras, light detection and ranging (LiDAR) sensors, radar sensors, far infrared (FIR) thermal sensors and ultrasonic sensors.

The host vehicle may identify other vehicles by an image or series of images recorded by the host vehicle external cameras. The images may be timestamped by an image processor and analyzed to identify the other vehicles, patterns of movement or changes in direction, vehicle model, and the like. The cameras may include RGB-D (red-green-blue-depth) sensors or similar imaging sensors that may capture images including four channels, i.e., three color channels and a depth channel configured to capture color images. The host vehicle camera can capture real-time data and compare the data to its base map, match patterns between the two, and determine its location with centimeter-level accuracy.

The cameras may be placed on a plurality of locations on the host vehicle, such as the roof, rear view mirrors, side mirrors (i.e., 104), in the rear window or configured on the top of the trunk as needed to capture a clear, 360 degree view of the surrounding environment.

At least one of the plurality of cameras may include a far infrared (FIR) sensor. Thermal sensors do not require any light to accurately detect, segment, and classify objects and pedestrians and are therefore well suited to improve autonomous systems safety.

FIR sensors can deliver reliable, accurate detection in real time and in any environmental condition because they access an additional layer of information that the other sensors do not. While radar and LiDAR sensors transmit and receive signals, a FIR thermal sensing camera passively collects heat signatures from nearby objects, converts the heat signatures into a VGA video, and computer vision algorithms detect and classify the objects. By sensing this infrared wavelength that is far longer than visible light, FIR cameras access a different band of the electromagnetic (EM) spectrum than other sensing technologies.

Infrared radiation operates at the lower end of the EM spectrum and is therefore invisible to the human eye. The infrared section of the electromagnetic spectrum is found between the visible waves and the microwaves. The infrared wavelength is between 0.75 and 1000 µm and is separated into three regions: near-infrared (NIR) from 0.75 to 3 µm, mid-infrared (MWIR) from 3 to 8 µm, and far-infrared (FIR) above 8 µm. The infrared window that is commonly used in thermal imagers spans 8-14 µm wavelengths, also known as L-WIR (long-wave infrared). Short wave infrared (SWIR) light is typically defined as light in the 0.9-1.7 µm wavelength range, but can also be classified from 0.7-2.5 µm. Since silicon sensors have an upper limit of approximately 1.0 µm, SWIR imaging requires unique optical and electronic components capable of performing in the specific SWIR range. Indium gallium arsenide (inGaAs) sensors are the primary sensors used in SWIR imaging, covering the typical SWIR range, but can extend as low as 550 nm to as high as 2.5 µm. SWIR is used for longer distance sensing applications. Thus, an infrared camera can generate a new layer of information in an all-weather solution that enables autonomous vehicles to detect objects that may not otherwise be perceptible to visible light cameras, LiDAR sensors or radar sensors. SW, MW and LW infrared sensors may be advantageous for detecting other vehicles in fog, snow or icy conditions as they capture blackbody radiation due to heat. Additionally, LiDAR and radar are active, energy-emitting modalities. LiDAR and radar installed and functioning on the host vehicle may interfere with that of another passing vehicle. As a passive technology, FIR can work to detect the host vehicle's surroundings without ever interfering with a FIR sensor on other vehicles. When the vehicle includes both LiDAR and infrared sensors together, care must be taken to choose sensors which operate at different wavelengths, in order to prevent interference due to overlapping wavelengths. A passive infrared imager may use wavelengths in the range of 0.7-1000 µm. Current state-of-the-art LiDAR systems are largely based on sensors using one of two wavelengths: 0.905 µm and 1.55 µm.

A FIR thermal sensor can be an infrared camera mounted in the front grille of the host vehicle, for example, that senses heat differences as sensitive as a tenth of a degree and creates a highly detailed thermal image of the world out in front of the host vehicle. An onboard computer runs custom algorithms to detect objects such as animals, pedestrians, and cyclists up to 100 meters ahead of the host vehicle and reacts in less than 150 milliseconds to detect these objects. Thermal sensing systems help drivers see objects three to four times farther than the host vehicle headlight range and improve visibility in fog, smoke, and oncoming headlight scenarios.

The LiDAR sensor may be a rotating 360° scanner. LiDAR provides a 360-degree view of the surrounding area. A continuously rotating LiDAR system sends thousands of laser pulses every second. These pulses collide with the surrounding objects and reflect back. The resulting light reflections are then used to create a 3D point cloud. An onboard computer records the reflection point of each laser and translates this rapidly updating point cloud into an animated 3D representation. The 3D representation is created by measuring the speed of light and the distance covered from the LiDAR device to an object and back to the LiDAR device (time of flight measurements) which helps to determine the position of the host vehicle with respect to other surrounding objects. The 3D representation may be used to monitor the distance between the host vehicle and any other vehicles on the road passing by, in front, behind or in a common trajectory with the host vehicle.

The LiDAR data may be used to calculate the distance between the LiDAR sensor and an object with accuracy and may calculate the exact size of the object. LiDAR is commonly used to make high-resolution maps. High-end LiDAR sensors can identify the details of a few centimeters at more than 100 meters. LiDAR works well in all light conditions, but the performance dwindles in the snow, fog, rain, and dusty weather conditions. The host vehicle may have a plurality of long-range LIDAR sensors attached to its roof, which can measure a 200-meter range around a 360-degree perimeter, Additionally, the host vehicle may use radar sensors to detect other vehicles. Radar sensors operate in much the same way as LiDAR, with the difference that radio waves are used instead of laser. In the radar sensor, the antenna doubles as a radar receiver as well as a transmitter. Since radio waves have less absorption than light waves when contacting objects, they can detect objects over relatively long distances. Radar also works equally well in all weather conditions such as fog, rain, and snow, and dust. However, it is less angularly accurate than LiDAR as it may loses the sight of the target vehicle on curves. It may be less accurate when multiple objects are placed very close to each other. For example, the radar analysis may consider two small cars in the vicinity as one large vehicle and send an incorrect proximity signal. Radars sensors can determine relative traffic speed or the velocity of a moving object accurately using the Doppler frequency shift.

When one or more of the sensors is a camera, computer vision techniques are used to detect other vehicles. These techniques can include object recognition, including shape and edge detection. Both LiDAR and camera recognition processes can be performed based on trained and/or pre-defined libraries of data, with known and recognizable shapes and edges of obstacles (e.g. vehicles, cyclists, etc.). Radar sensors can report detected obstacles along with a velocity of the obstacles.

Ultrasonic sensors are typically installed in newer cars as parking sensors. Ultrasonic sensors are limited in range to about ten feet. Ultrasonic sensors may be useful in identifying objects and hazards which are close to the autonomous vehicle.

The host vehicle computing device has circuitry and stored program instructions that, when executed by one or more processor, uses the data gathered by at least one of camera images, FIR thermal cameras, LiDAR, radar and ultrasonic sensors to build a global (or world) view of the surrounding environment. The video streams from the cameras, data from the LiDAR sensors, radar sensors, etc. are processed in real time to detect nearby vehicles and objects. The global view is developed by combining the representation of the surrounding environment with the map data by overlaying the nearby vehicles onto the map. The global view map dynamically provides a realistic perspective view of the driving environment. Object detection and recognition can include aspects of edge and shape detection and recognition, also incorporating other known aspects of object segmentation and recognition.

A road network may be defined using a data structure called a Road Network Definition File (RNDF), which consists of a set of waypoints in the Universal Transverse Mercator (UTM) coordinate system and linking information of these waypoints to create lanes, exits, merges, etc. Also, other semantic information like stop signs and traffic light positions are embedded in the data structure. This information is used by a trip planner to generate a route.

The map information further includes road position information (position information by lane), road shape information (curves, types of linear portions, curvatures of the curves, and the like), road width information (lane width information), and vehicle speed limit information regarding roads. The map information also includes position information regarding points of intersection and junctions, position information regarding temporary stop lines, crosswalk position information, and traffic light position information. The map information may also include road gradient information and road cant information.

A graph, which is used for tracking, is generated from this RNDF data. Each node in the graph corresponds to a waypoint in the RNDF. The same linking structure is maintained to connect the nodes in the RNDF. In case of merges and exits, links, nodes are interpolated using spline-fitting between end points of links and which are added to the graph.

Further details of integrating data from the plurality of sensors into a global view and map generation and updating may be found in U.S. Pat. No. 9,255,989 B2, incorporated herein by reference in its entirety.

The host vehicle guidance unit may include an image analysis module which can use camera images, 3D point cloud, radar and other sensor data to stitch together a representation of the surroundings of the host vehicle. Movement within the surrounding environment can include current traffic and roadway conditions, nearby entities, the status of other vehicles (e.g., speed, direction, etc.), and other data. Object recognition and computer vision techniques may be applied to the image data to identify the other vehicles, as well as intersections, signs, road lines, changes in elevation, road curves, objects in the road, and the like.

If the host vehicle is an autonomous or semi-autonomous vehicle, the host vehicle may also connect with nearby autonomous or semi-autonomous vehicles, and request that they share their trajectories, intentions to change trajectory and moving objects sensed in their surroundings. The cognitive map can synchronize this communicated information within the global map to provide a more complete view of the surroundings.

Storage for map data may be limited within the memory of the host vehicle. The host vehicle computing device may temporarily update its map in order to navigate around the object and make a decision to drop the change at a later time when the storage is needed for a more persistent anomaly. For example, if the object is identified as a dead animal, the host vehicle computing device may update its map temporarily to navigate around the dead animal and then drop the update. However, if the object is a road barrier or detour due to construction, the host vehicle computing device may update its map and report the change to the map server at a later time when the host vehicle is connected to the server.

In a non-limiting example, the computing device of the host vehicle may determine that surrounding vehicles are swerving around an object in roadway which is not on the map. The host vehicle may detect that the first five vehicles have swerved to avoid the object, but that later vehicles have not swerved. As the change in activity is not persistent, the host vehicle may not update its map with the object. However, if other vehicles continue to swerve around the object, the confidence level increases and the host vehicle may update its map. Each behavior may have a specified confidence level threshold which must be surpassed in order to update the map.

In another non-limiting example, the computing device of the host vehicle may determine that other vehicles are travelling on the shoulder of the roadway due to construction traffic. The computing device of the host vehicle may note that driving on the shoulder is illegal, but socially acceptable in this situation. The computing device of the host vehicle may reference its GPS to determine whether the construction traffic has been reported. If it has not been reported, the host vehicle may update its map for later reporting. Additionally, the computing device of the host vehicle may monitor the number of vehicles travelling on the shoulder and determine a confidence level. When the confidence level meets a threshold for updating, the computing device of the host vehicle may update its map with specifics of the construction and use of the shoulder for driving as a persistent update. If the confidence level is below the threshold for updating, the computing device of the host vehicle may use the observed activity of the other vehicles directly ahead to navigate through the area and not update its map.

A vehicle behavior analysis unit matches the monitored behavior of the other vehicles to a pre-trained library of vehicle behavior. The pre-trained library may be generated by training a trajectory generating an anomaly detector, such as an autoencoder, support vector machine, or other neural network with datasets of known vehicle behavior. Any regression model capable of predicting a kinematic state may be used. The neural network may be a recurrent neural network (RNN), such as a long short term memory (LSTM) model or a gated recurrent unit (GRU). These recurrent networks may be stacked, have convolutional components or be bidirectional. A bidirectional model introduces latency by the inclusion of a "looking backward" window.

An "autoencoder" is an unsupervised artificial neural network capable of encoding input data into related clusters, similar to sorting. An autoencoder is trained by a "training set" of data representing having known characteristics. Once trained, new data input to the autoencoder can be related to the trained data.

An autoencoder_maps an original data space in a high dimension space to a new space of lower dimensionality which is more suitable for clustering. "Auto" means that this method is unsupervised and "encoder" means it learns another representation of data. (See Song, C., Liu, F, Huang, Y., Wang, L. Tan, T., "Auto-Encoder Based Data Clustering", J. Ruiz-Shulcloper and G. Sanniti di Baja (Eds.): CIARP 2013, Part I, LNCS 8258, pp. 117-124, 2013, Springer-Verlag Berlin Heidelberg 2013, incorporated herein by reference in its entirety).

An autoencoder may be used to detect anomalous behavior. An autoencoder trained with relative map position and vehicle trajectory datasets under "normal" or "correct" road conditions can be used to produce clusters of related data for the normal conditions. When a set of test data is input to the trained autoencoder, the grouped test data in the feature space of the encoder can be compared to the trained clusters to show the distance, such as variation from the expected map position or previously programmed route of the vehicle. More information on the use of an autoencoder in anomaly detection can be found in "LSTM Autoencoder for Anomaly Detection", B. Larzalere, published by Towards Data Science, Sep. 25, 2019, https://towardsdatascience.com/lstm-autoencoder-for-anomaly-detection-e1f4f2ee7ccf, incorporated herein by reference in its entirety.

The vehicle behavior analysis unit determines the confidence level by monitoring the behavior over a time period. For example, if six vehicles exhibit the pattern of activity over a time period related to the particular behavior, the confidence level may be below the confidence level threshold. However, if ten vehicles exhibit the same pattern of activity in the time period or at a later time period, the confidence level may rise above the confidence level threshold and the map may be updated with the behavior.

Additionally, the vehicle behavior analysis unit may identify the cause of the vehicle behavior and make a decision as to its persistence. A persistence value may be included with the behavior data in the map, and used as a factor in deciding whether to retain the update, drop it if a behavior with a higher persistence value must be stored and there is not enough memory to store both behaviors, and also as a deciding factor in whether to transmit the update to a map server at a later time.

In a further non-limiting example, the computing device of the host vehicle may update its map temporarily due to a roadway obstruction, and drop the update after passing the obstruction. For example, the computing device of the host vehicle may notice vehicles travelling on the shoulder because of the presence of an accident and rerouting of traffic by the police around the accident. In this situation, the presence of an accident is not a persistent change in roadway conditions and the update can be dropped once the host vehicle has navigated around the accident.

In a non-limiting example of a persistent change, the computing device of the host vehicle may monitor the activity of other vehicles and notice the other vehicles are not following the trajectory of the roadway as shown on the map, due to a detour of the roadway which was not shown on the map. The host vehicle may update its map and retain the update for reporting at a later time to the central map server.

In another non-limiting example of a persistent change, the computing device of the host vehicle may notice that other vehicles are not stopping where expected on the map due to traffic lights not working. The host vehicle may report this change to a traffic authority and update its map. The host vehicle may retain the update for reporting at a later time to the central map server.

In a further non-limiting example of a persistent change, the computing device of the host vehicle may notice that other vehicles are swerving due to a pothole in the roadway. The computing device may update its map to navigate around the pothole and retain the update for reporting at a later time to the central map server.

As illustrated in FIG. 1, the host vehicle includes a computing device, such as an electronic control unit (ECU) 110, for carrying out the autonomous or semi-autonomous driving control. The ECU has a central processing unit (CPU), a read-only memory (ROM), a random access memory (RAM), a controller area network (CAN) communication circuit, and the like (not shown in FIG. 1). Various functions are realized in the ECU by a program stored in the ROM being loaded into the RAM and the program loaded into the RAM being executed by the CPU. A GPS receiving unit 101, external sensors 102, internal sensors 103 (such as acceleration, speed, gyroscopic sensors), an in-vehicle map database 104, a navigation unit 105, actuators 106 (steering, throttle, brake and the like) and a communication unit 107 are connected to the ECU 110 via a controller area network (CAN) communication circuit. The computing device 110 computes error information based on the image of the surroundings of the host vehicle captured by the external sensors, and the satellite signal received by the GPS receiving unit 101.

The GPS receiving unit 101 is mounted in the host vehicle and functions as a position measurement unit that measures the position of the host vehicle. The GPS receiving unit 101 measures the position of the host vehicle (such as a latitude and a longitude of the host vehicle) by receiving signals from three or more GPS satellites. The GPS receiving unit 101 transmits information on the measured position of the host vehicle to the ECU.

The plurality of external sensors 102 are detection instruments for detecting obstacles and other vehicles in the vicinity of the host vehicle. The external sensors 102 include at least one of cameras, LiDAR sensors, radar sensors, thermal sensors and ultrasonic sensors. Data from the external sensors 102 is used to form a global view of the surrounding environment, for locating the host vehicle and other vehicles within the surrounding environment, for tracking their trajectories and for detecting patterns in the activity of the surrounding vehicles.

The cameras may be disposed on a back side of a windshield of the host vehicle and a back surface of the host vehicle. The cameras may be disposed on right and left side surfaces of the host vehicle. The cameras transmit imaging information to the ECU 110, the imaging information being obtained by spaces in front of and behind the host vehicle being imaged. The camera may be a monocular camera or a stereo camera. A stereo camera has two imaging units that are placed to reproduce a binocular disparity. The imaging information of the stereo camera includes depth-direction information.

LiDAR detects the obstacle outside the host vehicle by using light. The LiDAR unit detects the obstacle by transmitting the light to the vicinity of the host vehicle, receiving the light reflected by the obstacle, and measuring a distance to a reflection point. The LiDAR transmits information on the detected obstacle to the ECU 110. LiDAR and the radar do not necessarily have to be provided on the host vehicle along with each other.

The radar unit(s) detect the obstacle (such as another vehicle) in the vicinity of the host vehicle by using radio waves (such as millimeter waves). The radar unit detects the obstacle by transmitting the radio waves to the vicinity of the other vehicle and receiving the radio waves reflected by the obstacle. The radar unit transmits information on the detected obstacle to the ECU 110. The obstacle may include a dynamic obstacle, such as a pedestrian, a bicycle or another vehicle, as well as the fixed obstacles.

The navigation unit 105 includes a positioning unit 122 which includes a vehicle position recognition unit 111, a road environment recognition unit 112 and a traveling state recognition unit 113 and a map update determination system 120, a travelling control unit 115 and a vehicle behavior analysis unit 119.

The positioning unit 122 receives data from the external 102 and internal sensors 103 which is combined with the map formed in the map update determination system 120 to generate the global map. The vehicle behavior analysis unit 119 identifies surrounding vehicles and their patterns of activity and generates a confidence score for the activity pattern. Based on the confidence score, the in-vehicle map database may be updated.

The internal sensor 103 may be a plurality of detection instruments that detect the traveling state of the host vehicle. The internal sensor 103 includes the host vehicle speed sensor, an acceleration sensor, a steering angle sensor and a yaw rate sensor. These sensors transmit information regarding the host vehicle to the ECU 10.

The map database 104 is a map information storage database. The map database 104 is formed in a hard disk drive that is mounted in the host vehicle. The map database 104 may be connected to a server in a map information management center by wireless communication via the communication unit 10. The map database 104 may update the map information on a regular basis or upon entering areas of high data connectivity by using the latest map information stored in the map information management center. The map database 104 stores the map information and any update information, such as map discrepancy information stored as a result of detecting patterns of activity of other vehicles along the roadway which indicate a persistent change in road conditions.

The map database 104 is operatively connected to a map update determination system 120 including a traveling plan generation unit 114, a detection value acquisition unit 116, an evaluation value calculation unit 117, and a map update determination unit 118. The road environment recognition unit 112 generates the global view which recognizes obstacles and other vehicles around the host vehicle based on data generated by the external sensors 102.

The traveling plan generation unit 114 generates the traveling plan of the host vehicle based on a target route set by the navigation unit 105 and the map information of the map database 104.

The detection value acquisition unit 116 and evaluation value calculation unit 117 compare the acquired information from the internal and external sensors to the travelling plan in order to correct the navigation of the host vehicle along the trajectory of the travelling plan.

The map update determination unit 118 determines the necessity of updating the map when the acquired information from the internal and external sensors does not match the travelling plan.

A vehicle behavior analysis unit 119 is also included in the ECU. The vehicle behavior analysis unit 119 identifies surrounding vehicles and compares successive images to determine driving patterns of the surrounding vehicles, such as slowing down, speeding up, turning, swerving, leaving the roadway, or the like. In the present disclosure, the map update determination unit 118 uses the vehicle activity analysis as an additional input in deciding whether a map update is necessary and whether it is persistent or temporary. Further details of map generation and updating may be found in U.S. Pat. No. 10,215,572 B2, incorporated herein by reference in its entirety.

Figure 2:
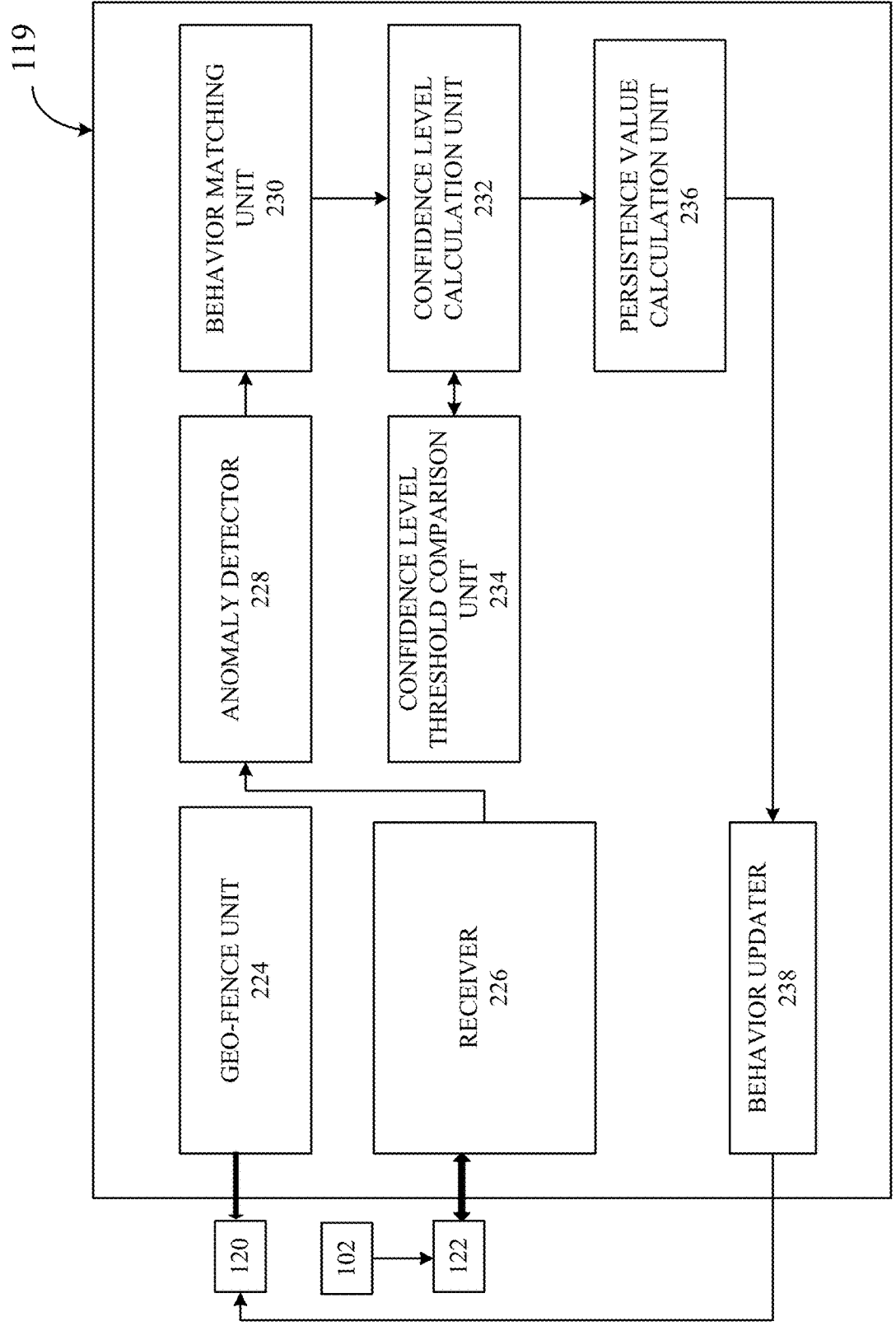
FIG. 2 is a block diagram of a vehicle behavior analysis unit, according to certain embodiments.

The vehicle behavior analysis unit 119 is shown in FIG. 2. The vehicle behavior analysis unit 119 is operatively connected to the positioning unit 122, which receives data from the external sensors 102 and the map update determination system 120, which includes the in-vehicle map database 104. An area of interest is identified in which vehicles are deviating from the map in a region ahead of the host vehicle. For example, a geo-fence unit 224 may request a geo-fence around the area of interest on the map. The geo-fenced area may not necessarily include the position of the host vehicle. For example if the vehicle behavior analysis unit "sees" a section of roadway ahead where the behavior patterns of the other vehicles do not follow the map of that section of the roadway, a geo-fence may be placed around the section of roadway ahead and the vehicle behavior in that section will be monitored. The vehicle computing device may request that autonomous and semi-autonomous vehicles in the geo-fenced area share their data streams. Alternatively, the first time a vehicle detects a discrepancy, the discrepancy may be within the vehicle's detection and prediction range. The detection of this anomaly communicated to the remote map server may lead to the remote map server distributing a geo-fence or geo-temporal fence (i.e., collect sensor data during a time period) to other vehicles to confirm the detected anomalies.

A receiver 226 is operatively connected to the positioning unit 122, which includes a road environment recognition unit 112, to receive data streams from the vehicles in the geo-fenced area, from the external sensors 102 and from shared communications from any autonomous vehicles in the geo-fenced area. Upon receiving the data streams (if any), the road environment recognition unit 112 may transmit the new data to the anomaly detector 228 to determine patterns in the behavior of the other vehicles. The behavior matching unit 230 matches the patterns to a database of known patterns. Based on the number of vehicles exhibiting a pattern, the confidence level calculation unit 232 calculates the confidence level. The confidence level is compared to determine whether the confidence level is above a threshold. If the confidence level is above the confidence level threshold for that behavior, a persistence value is calculated based on an identification of the cause of the discrepancy and the likelihood of its permanence. The matched behavior and the persistence value are transmitted to the behavior updater 238, which transmits the behavior to the in-vehicle map database 104 of the map update determination system 120.

The vehicle behavior analysis unit 119 determines the amount of deviation of each other vehicle from the map, the confidence level of the deviation and the persistence value of the deviation. The vehicle behavior analysis unit 119 may use the new data stream to attempt to identify the cause of the deviations (such as a pothole, road construction, an accident, a missing sign, traffic lights not working, or the like) and include the cause of the deviations in the calculation of the persistence value. If the confidence level is higher that the confidence level threshold, the vehicle behavior analysis unit will transmit the vehicle behavior and the persistence value to the in-vehicle map database to update the map. The behavior is tagged with the persistence value and used in determining whether to update the map temporarily and drop the behavior at a later time when memory in the in-vehicle map database is needed or to retain the update for uploading the remote map server at a later time.

Figure 3:
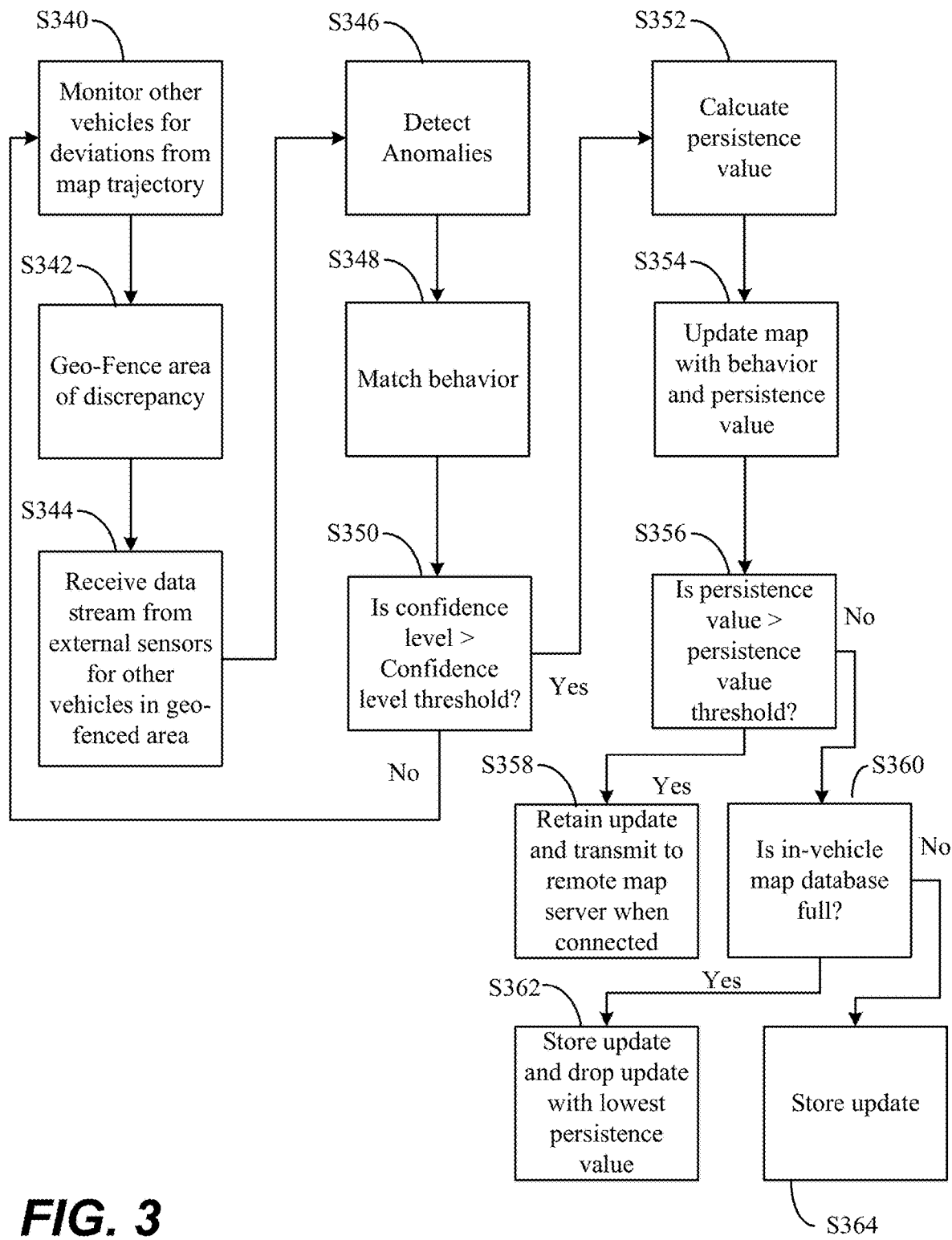
FIG. 3 is an exemplary flowchart of a vehicle behavior analysis process, according to certain embodiments.

FIG. 3 is a flow chart of the process used by the computing device of the host vehicle to determine the behavior of other vehicles in the surrounding environment and whether or not to update the vehicle map. At step S340, the computing device monitors other vehicles for deviations from the map trajectory. At step S342, the area in which deviations are found is geo-fenced. At step S344, the vehicle behavior analysis unit 119 receives the data stream from the host vehicle external sensors monitoring other vehicles in the geo-fenced area. At step S346, the data stream is applied to the anomaly detector to determine patterns in the behavior of the other vehicles. At step 348, the behavior matching unit 230 matches the patterns to a database of known patterns. At step 350, based on the number of vehicles exhibiting the behavior pattern, the confidence level calculation unit 232 calculates the confidence level. At step 350, the confidence level is compared to a threshold. If the confidence level is greater than the threshold (Yes), the behavior and confidence level are transmitted to S352, where the persistence value is calculated. At step S354, the in-vehicle map database 104 is updated with the behavior and persistence value. At step S356, a decision is made as to whether the persistence value is greater than a persistence value threshold for that behavior. If Yes, (S358), then the update is retained as a permanent update and is later transmitted to the map server with the raw and processed data when the vehicle is in an area of high data transfer. If No, (S360), a determination is made as to whether the in-vehicle map database is full. If Yes (S362), the update is stored and a previous update with a lower persistence value is dropped. If No (S364), the update is stored.

Figure 4:
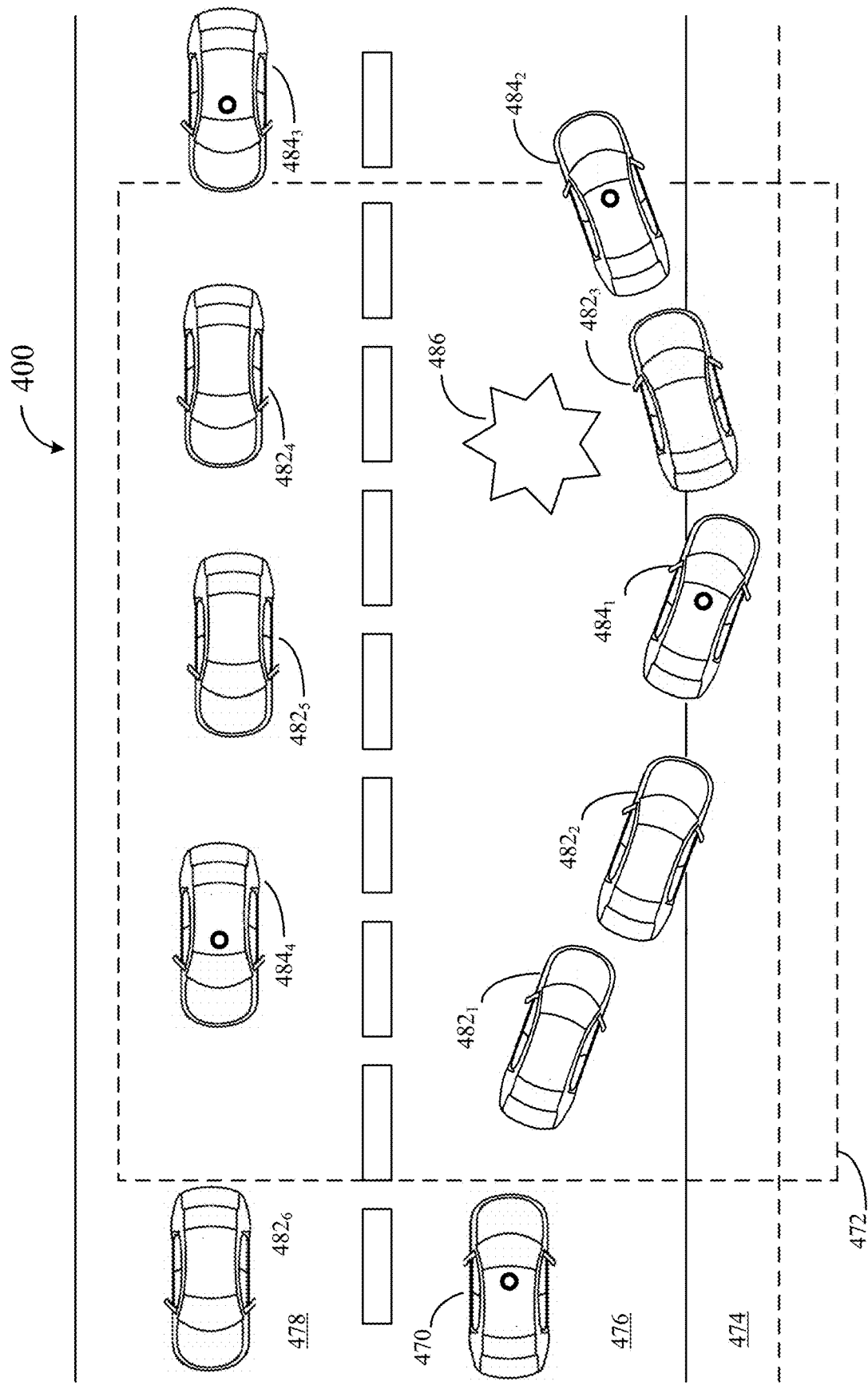
FIG. 4 is a map of a roadway showing vehicles exhibiting a behavior, according to certain embodiments.

FIG. 4 illustrates a map 400 of a roadway lane 476 on which a host vehicle 470 is travelling.

Non-autonomous vehicles 482$_1$, 482$_2$, 482$_3$ and autonomous or semi-autonomous vehicles 484$_1$ and 484$_2$ are travelling in the same direction as the host vehicle in roadway lane 476. Additionally, non-autonomous vehicles 482$_4$, 482$_5$, 482$_6$ and autonomous or semi-autonomous vehicles 484$_3$ and 484$_4$ are travelling in the operation direction as the host vehicle 470 in roadway lane 478. The host vehicle has external sensors (104, FIG. 1) which are sensing the surrounding environment. The vehicles 482$_1$, 482$_2$, 482$_3$, 484$_1$ and 484$_2$ are "noticed" by the computing device of the host vehicle to be travelling on the shoulder 474. The computing device of the host vehicle generates a geo-fence 474 around the area where the vehicles appear to deviate and continues to image the geo-fenced area. Additionally, the host vehicle may request that the autonomous/semi-autonomous vehicles 484$_1$-484$_4$ share their data streams from their external sensors. These datastreams are analyzed by the host vehicle to identify the reason why the vehicles are driving on the shoulder. Alternatively, the datastreams may be transmitted to the remote map server, which processes the data and distributes information back to the host vehicle and other vehicles in the area. The persistence value is directly dependent on the identity of the obstruction 486. In a non-limiting example, a dead animal in the roadway may have a small persistence value (i.e., 1 hour), an overturned vehicle may have a longer persistence value (i.e., 2 hours, an oil spill may have an even longer persistence value (i.e., 4 hours), road construction may last many months and have a very high persistence value. The computing device may update the map temporarily for updates with small persistence values in order to navigate around the obstruction and drop the update later before entering an area of high data connectivity if the map database is full. Alternatively, the computing device may update the map and connect as soon as possible to the map server if the update is of high persistence or the behavior is an emergency.

The first embodiment is illustrated with respect to FIG. 1-4. The first embodiment describes a system 100 for updating an in-vehicle map 104 of a host vehicle, the system comprising a plurality of external sensors 102 of the host vehicle configured to monitor activities of other vehicles in a surrounding environment, a computing device 110 having a receiver operatively connected to the first plurality of sensors, the computing device including a computer-readable medium comprising program instructions, executable by processing circuitry, to cause the processing circuitry to determine whether the activities of the other vehicles deviate from the map, geo-fence (see geo-fence unit 224) a map region in which the activities of the other vehicles deviate from the map, receive a data stream from the external sensors 102 focused on the geo-fenced map region, analyze patterns of behavior (228, 230) of the activities of the other vehicles from the data stream, and determine (232, 234, 236, 238) whether to update a database of the in-vehicle map with the behavior.

The computing device of the system further comprises an anomaly detector 228 configured to analyze the patterns of behavior of the activities of the other vehicles and output the patterns of behavior to a feature space, a behavior matching unit 230 operatively connected to the output of the anomaly detector, wherein the behavior matching unit is configured to match the patterns of behavior to a database of known patterns of behavior, a confidence level calculation unit 232 operatively connected to the behavior matching unit, wherein the confidence level calculation unit is configured to determine a confidence level based on a number of the other vehicles exhibiting the pattern of behavior, and a confidence level threshold comparison unit 234 configured to compare the confidence level to a confidence level threshold.

The system further comprises a persistence value calculation unit 236 operatively connected to the confidence level calculation unit when the confidence level is equal to or above the confidence level threshold, wherein the persistence value calculation unit is configured to determine a persistence value based on the pattern of behavior.

The system further comprises a behavior updater 238 operatively connected to the persistence value calculation unit, wherein the behavior updater is configured to transmit an update to the in-vehicle map database 104, the update including the behavior and the persistence value.

The system further comprises an in-vehicle map 120 which includes a map update determination unit 118 configured to retain or drop an update of the behavior based on the persistence value, wherein the in-vehicle map is operatively connected to a communication device (communication unit 107), wherein the communication device is configured to transmit a map update to a map server.

The second embodiment is illustrated with respect to FIG. 1-4. The second embodiment describes a method for updating an in-vehicle map 120 of a host vehicle, comprising receiving data streams from a plurality of external sensors 102 of a host vehicle, processing, using processing circuitry, the data streams to monitor the activities of other vehicles, determining whether the activities of the other vehicles deviate from map, geo-fencing a map region (S342) in which the activities of the other vehicles deviate from the map, receiving a data stream from the external sensors focused on the geo-fenced map region (S344), analyzing patterns of behavior of the activities of the other vehicles from the data stream (S346), and determining whether to update a database of the in-vehicle map with the behavior.

The method includes training an anomaly detector 228 with datasets of known patterns of behavior, applying the data stream from the external sensors focused on the geo-fenced map region to the anomaly detector (S344, S346), and outputting patterns of behavior of the data stream to an output of the anomaly detector; and matching (S348) the patterns of behavior of the data stream to a database of known patterns of behavior to identify the behavior.

The method further includes calculating a confidence level (232) of the behavior based on a number of the other vehicles exhibiting the behavior, comparing the confidence level of the behavior to a confidence level threshold (S350), continuing to monitor the activities of other vehicles if the confidence level is below the confidence level threshold, and outputting the confidence level of the behavior if the confidence level is equal to or above the confidence level threshold.

The method additionally includes calculating a persistence value (S352) of the behavior when the confidence level is equal to or above the confidence level threshold, and transmitting an update to the database of the in-vehicle map, the update including the behavior and the persistence value.

The method includes retaining the update (S358) of the behavior in the database of the in-vehicle map if the persistence value is equal to or above a persistence value threshold and transmitting the update of the behavior to a map server during a time of high data connectivity, dropping the update of the behavior if the persistence value is below a persistence value threshold and the in-vehicle map database is full, updating the in-vehicle map with the behavior if the persistence value is below a persistence value threshold and above a persistence value of a previously stored update, and dropping the previously stored update (S362).

The method includes determining the confidence level threshold based on the behavior and determining the persistence value threshold based on the behavior.

The third embodiment is illustrated with respect to FIG. 1-8. The third embodiment describes a non-transitory computer readable medium having instructions stored therein that, when executed by one or more processors, cause the one or more processors to perform a method for updating an in-vehicle map of a host vehicle for updating an in-vehicle map 120 of a host vehicle, comprising receiving data streams from a plurality of external sensors 102 of a host vehicle, processing the data streams to monitor the activities of other vehicles, determining whether the activities of the other vehicles deviate from map, geo-fencing a map region (S342) in which the activities of the other vehicles deviate from the map, receiving a data stream from the external sensors focused on the geo-fenced map region (S344), analyzing patterns of behavior of the activities of the other vehicles from the data stream (S346), and determining whether to update a database of the in-vehicle map with the behavior.

The non-transitory computer readable medium method includes training an anomaly detector 228 with datasets of known patterns of behavior, applying the data stream from the external sensors focused on the geo-fenced map region to the anomaly detector (S344, S346), and outputting patterns of behavior of the data stream to an output of the anomaly detector; and matching (S348) the patterns of behavior of the data stream to a database of known patterns of behavior to identify the behavior.

The non-transitory computer readable medium method further includes calculating a confidence level (232) of the behavior based on a number of the other vehicles exhibiting the behavior, comparing the confidence level of the behavior to a confidence level threshold (S350), continuing to monitor the activities of other vehicles if the confidence level is below the confidence level threshold, and outputting the confidence level of the behavior if the confidence level is equal to or above the confidence level threshold.

The non-transitory computer readable medium method additionally includes calculating a persistence value (S352) of the behavior when the confidence level is equal to or above the confidence level threshold, and transmitting an update to the database of the in-vehicle map, the update including the behavior and the persistence value.

The non-transitory computer readable medium method includes retaining the update (S358) of the behavior in the database of the in-vehicle map if the persistence value is equal to or above a persistence value threshold and transmitting the update of the behavior to a map server during a time of high data connectivity, dropping the update of the behavior if the persistence value is below a persistence value threshold and the in-vehicle map database is full, updating the in-vehicle map with the behavior if the persistence value is below a persistence value threshold and above a persistence value of a previously stored update, and dropping the previously stored update (S362).

Figure 5:
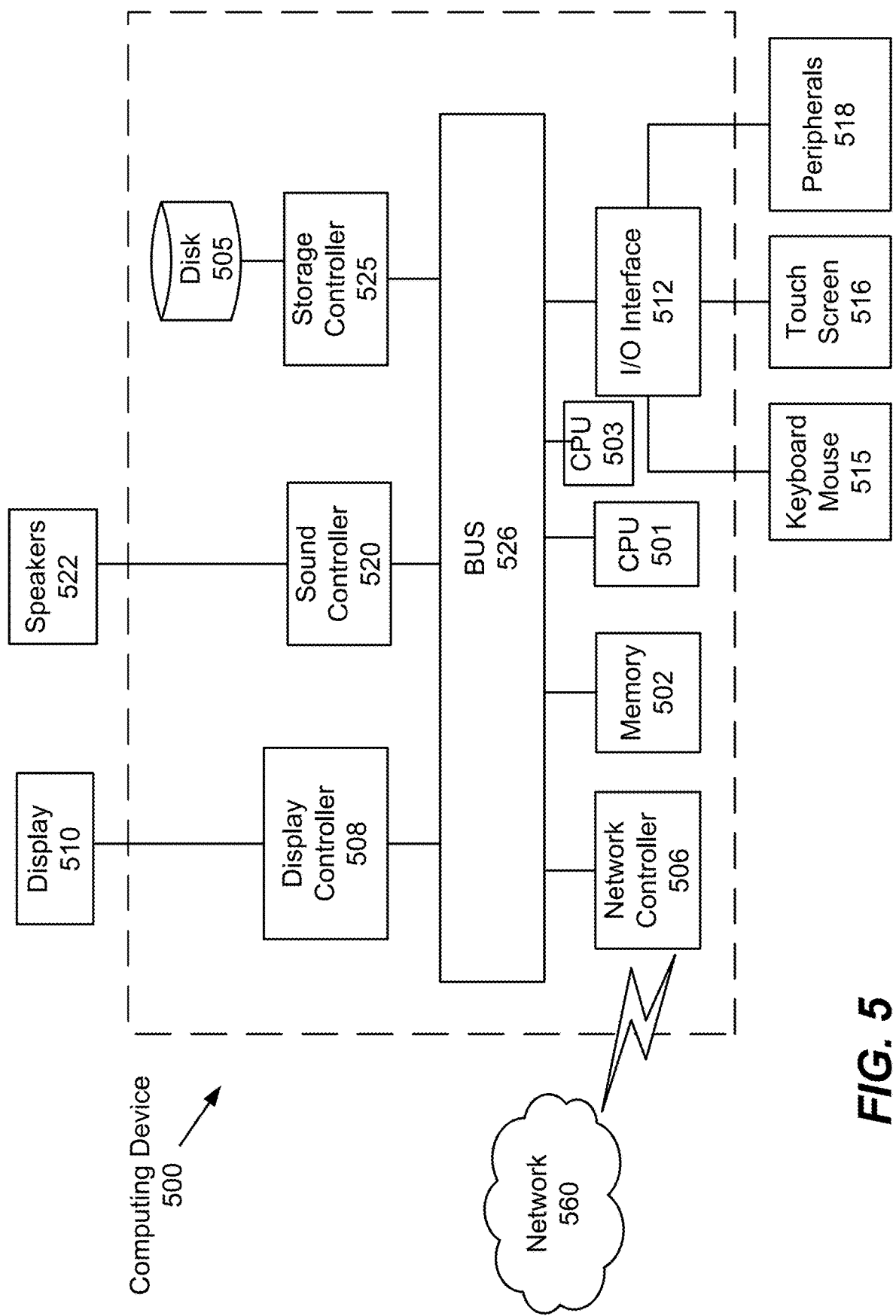
FIG. 5 is an illustration of a non-limiting example of details of computing hardware used in the computing device, according to certain embodiments.

Next, further details of the hardware description of the computing environment of FIG. 1, according to exemplary embodiments, is described with reference to FIG. 5. In FIG. 5, a controller 500 is described is representative of the system 100 of FIG. 1 in which the controller is a computing device which includes a CPU 501 which performs the processes described above/below. The process data and instructions may be stored in memory 502. These processes and instructions may also be stored on a storage medium disk 504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 501, 503 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 501 or CPU 503 may be a Xenon or Core processor from Intel of America or an Opteron processor from AMD of America, or may be other processor types that would be recognized by one of ordinary skill in the art. Alternatively, the CPU 501, 503 may be implemented on an FPGA, ASIC, PLD or using discrete logic circuits, as one of ordinary skill in the art would recognize. Further, CPU 501, 503 may be implemented as multiple processors cooperatively working in parallel to perform the instructions of the inventive processes described above.

The computing device in FIG. 5 also includes a network controller 506, such as an Intel Ethernet PRO network interface card from Intel Corporation of America, for interfacing with network 560. As can be appreciated, the network 560 can be a public network, such as the Internet, or a private network such as an LAN or WAN network, or any combination thereof and can also include PSTN or ISDN subnetworks. The network 560 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 may interface as needed with a keyboard and/or mouse 514 as well as a touch screen panel 516 on or separate from display 510. General purpose I/O interface may also connect to a variety of peripherals 518 including printers and scanners, such as an OfficeJet or DeskJet from Hewlett Packard, as needed.

The general purpose storage controller 524 connects the storage medium disk 504 with communication bus 526, which may be an ISA, EISA, VESA, PCI, or similar, for interconnecting all of the components of the computing device. A description of the general features and functionality of the display 510, keyboard and/or mouse 514, as well as the display controller 508, storage controller 524, network controller 506, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
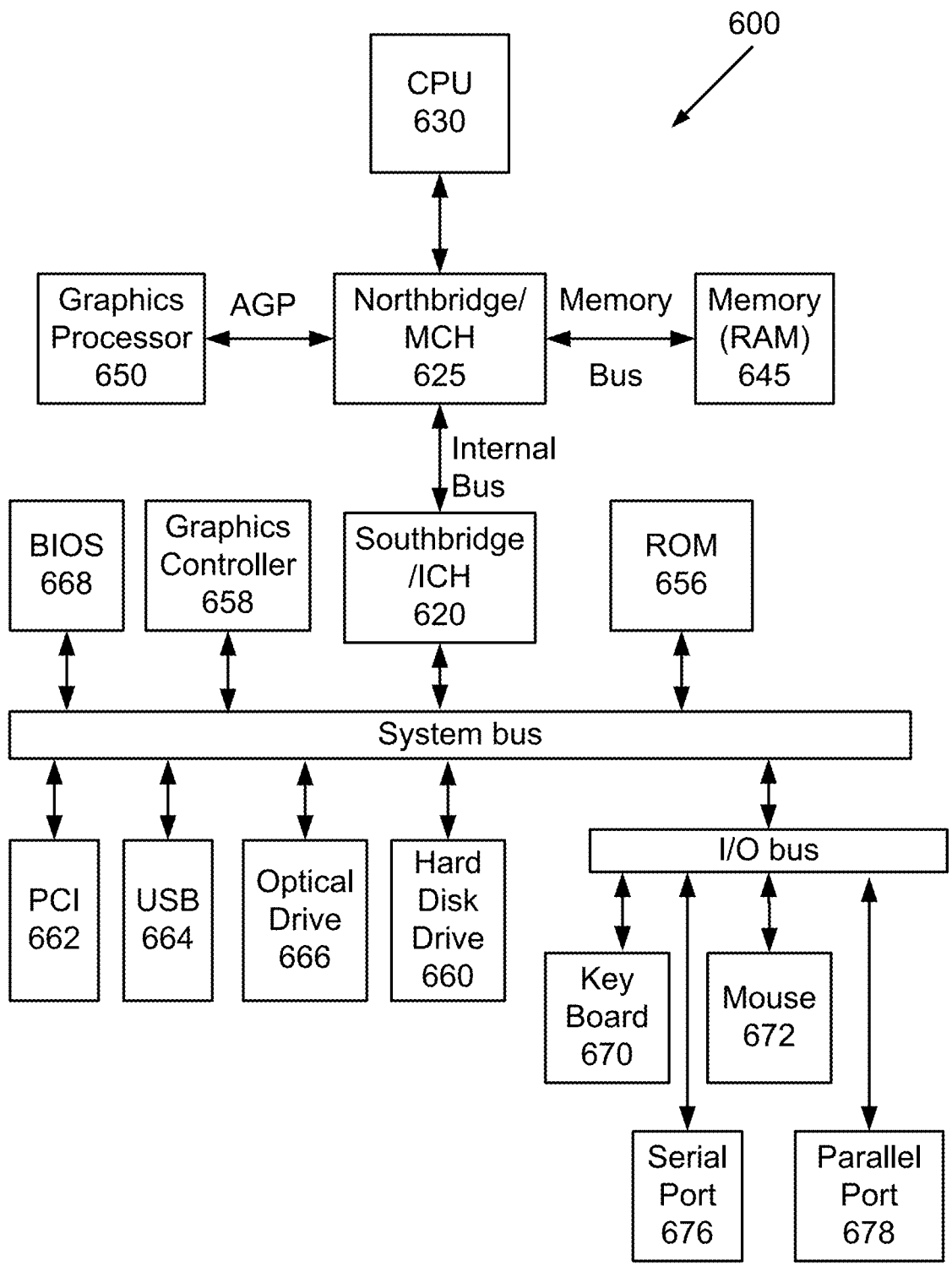
FIG. 6 is an exemplary schematic diagram of a data processing system used within the computing device, according to certain embodiments.

FIG. 6 shows a schematic diagram of a data processing system, according to certain embodiments, for performing the functions of the exemplary embodiments. The data processing system is an example of a computer in which code or instructions implementing the processes of the illustrative embodiments may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

Figure 7:
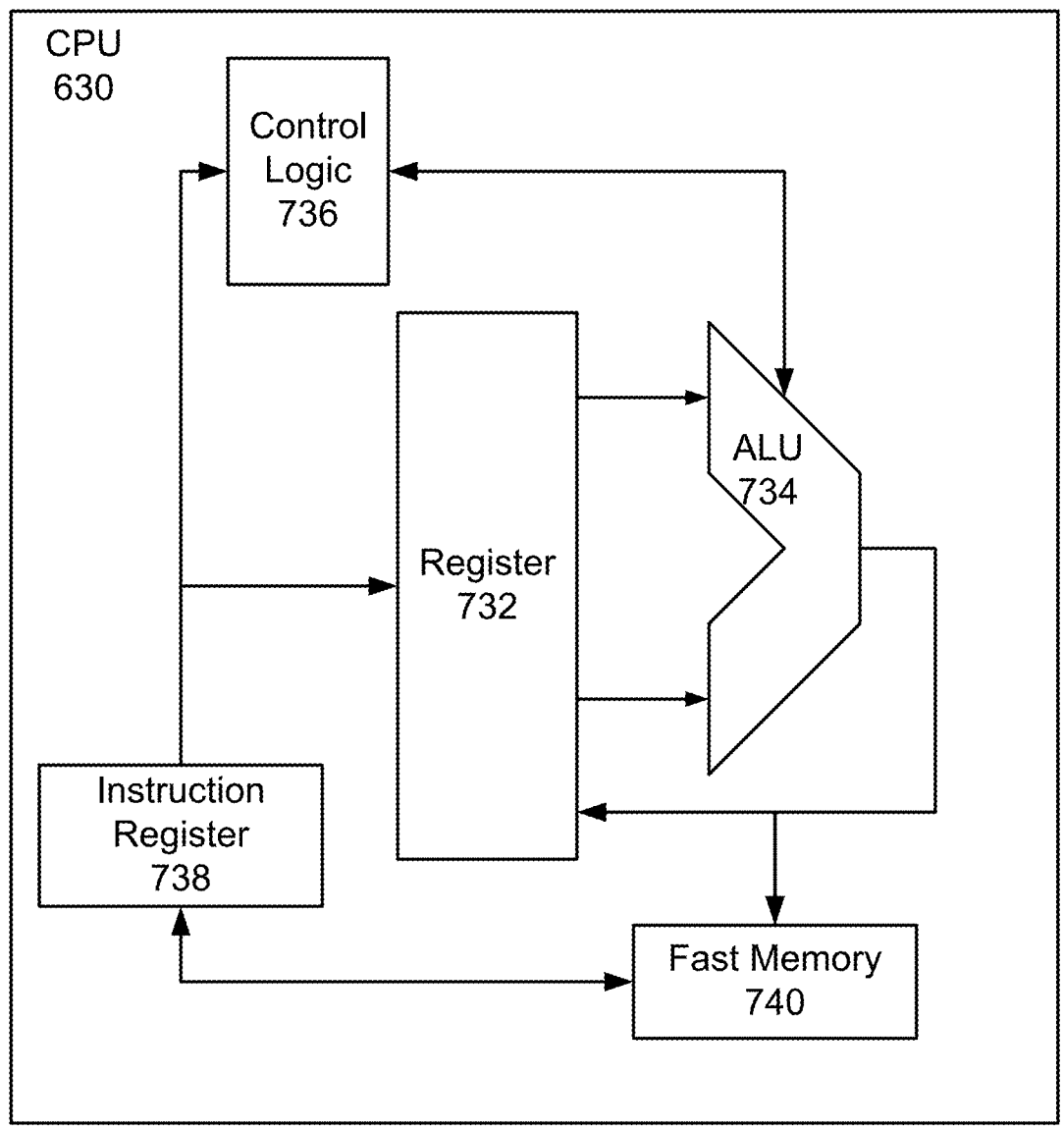
FIG. 7 is an exemplary schematic diagram of a processor used with the computing device, according to certain embodiments.

For example, FIG. 7 shows one implementation of CPU 630. In one implementation, the instruction register 738 retrieves instructions from the fast memory 740. At least part of these instructions are fetched from the instruction register 738 by the control logic 736 and interpreted according to the instruction set architecture of the CPU 730. Part of the instructions can also be directed to the register 732. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain implementations, the instruction set architecture of the CPU 830 can use a reduced instruction set architecture, a complex instruction set architecture, a vector processor architecture, a very large instruction word architecture. Furthermore, the CPU 630 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 688 through a PCI bus 662.

The PCI devices may include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation the I/O bus can include a super I/O (SIO) device.

Further, the hard disk drive (HDD) 660 and optical drive 666 can also be coupled to the SB/ICH 620 through a system bus. In one implementation, a keyboard 670, a mouse 672, a parallel port 678, and a serial port 676 can be connected to the system bus through the I/O bus. Other peripherals and devices that can be connected to the SB/ICH 620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 8:
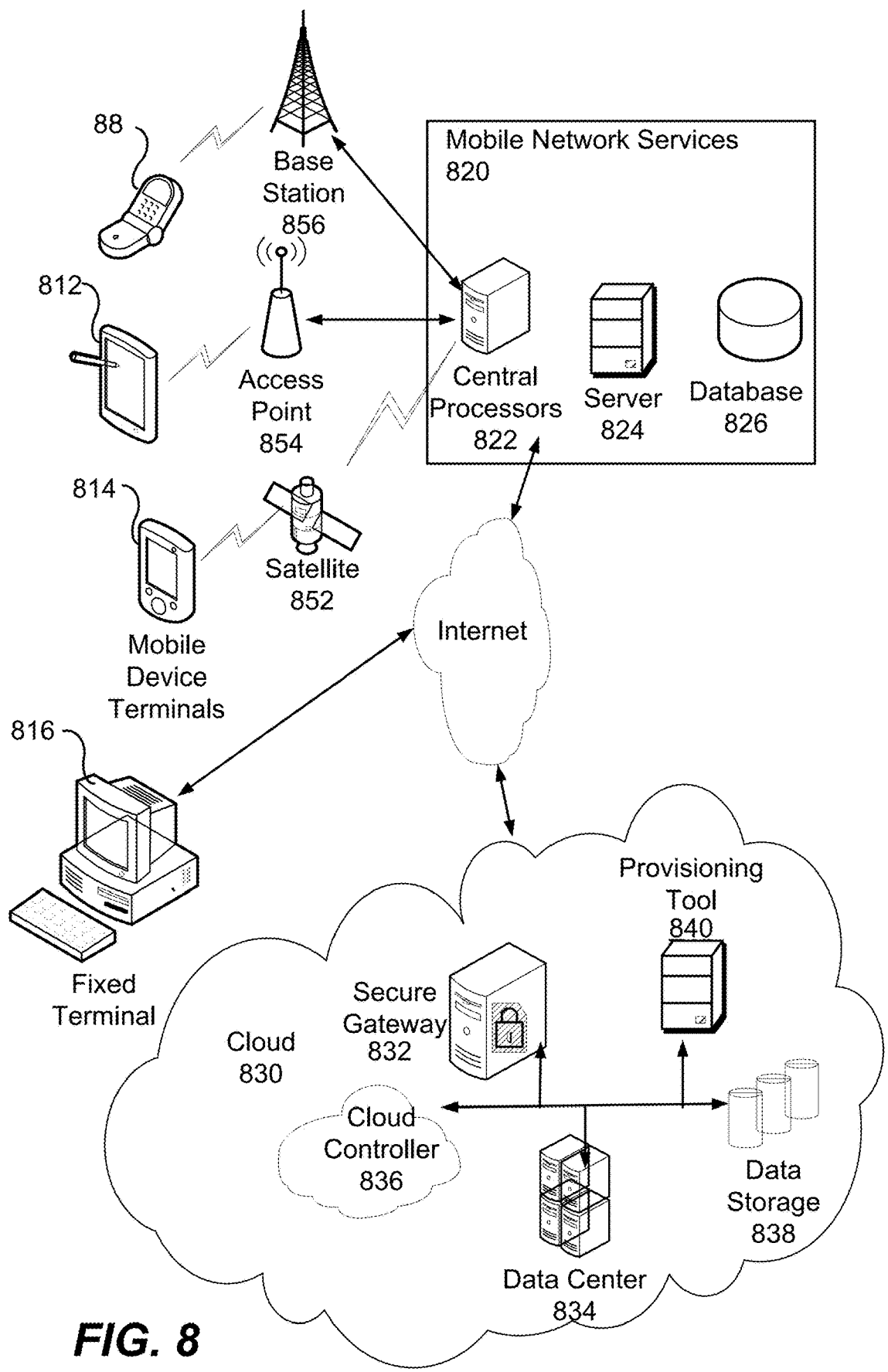
FIG. 8 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 8, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A system for updating an in-vehicle map of a host vehicle, comprising:
a plurality of external sensors of the host vehicle configured to monitor activities of other vehicles in a surrounding environment;
a computing device having a receiver operatively connected to the first plurality of sensors, the computing device including processing circuitry configured to:
determine whether the activities of the other vehicles deviate from the map;
geo-fence a map region in which the activities of the other vehicles deviate from the map;
receive a data stream from the external sensors focused on the geo-fenced map region;
analyze patterns of behavior of the activities of the other vehicles from the data stream;
determine a confidence level of the behavior based on a number of the other vehicles exhibiting the behavior, wherein the confidence level is directly proportional to the number of the other vehicles that exhibit the behavior, and
determine whether to update a database of the in-vehicle map with the behavior.

2. The system of claim 1, wherein the processing circuitry is further configured to:
analyze the patterns of behavior of the activities of the other vehicles and output the patterns of behavior.

3. The system of claim 2, wherein the processing circuitry is further configured to:
match the patterns of behavior to a database of known patterns of behavior.

4. The system of claim 3, wherein the processing circuitry is further configured to:
compare the confidence level to a confidence level threshold.

5. The system of claim 4, wherein the processing circuitry is further configured to:
when the confidence level is equal to or above the confidence level threshold, determine a persistence value based on the pattern of behavior.

6. The system of claim 5, wherein the processing circuitry is further configured to:
transmit an update to the in-vehicle map database, the update including the behavior and the persistence value.

7. The system of claim 6, wherein the processing circuitry is further configured to:
retain or drop an update of the behavior based on the persistence value.

8. The system of claim 6, wherein the in-vehicle map is operatively connected to a communication device, wherein the communication device is configured to transmit a map update and the data stream from the external sensors data to a map server.

9. A method for updating an in-vehicle map of a host vehicle, comprising:
receiving data streams from a plurality of external sensors of a host vehicle;
processing, using processing circuitry, the data streams to monitor the activities of other vehicles;
determining whether the activities of the other vehicles deviate from map;
geo-fencing a map region in which the activities of the other vehicles deviate from the map;
receiving a data stream from the external sensors focused on the geo-fenced map region;
analyzing patterns of behavior of the activities of the other vehicles from the data stream;
determining a confidence level of the behavior based on a number of the other vehicles exhibiting the behavior, wherein the confidence level is directly proportional to the number of the other vehicles that exhibit the behavior; and
determining whether to update a database of the in-vehicle map with the behavior.

10. The method of claim 9, further comprising:
training an anomaly detector with datasets of known patterns of behavior;
applying the data stream from the external sensors focused on the geo-fenced map region to the anomaly detector; and
outputting patterns of behavior of the data stream to an output of the anomaly detector.

11. The method of claim 10, further comprising:
matching the patterns of behavior of the data stream to a database of known patterns of behavior to identify the behavior.

12. The method of claim 11, further comprising:
comparing the confidence level of the behavior to a confidence level threshold;
continuing to monitor the activities of other vehicles if the confidence level is below the confidence level threshold; and
outputting the confidence level of the behavior if the confidence level is equal to or above the confidence level threshold.

13. The method of claim 12, further comprising:
calculating a persistence value of the behavior when the confidence level is equal to or above the confidence level threshold; and
transmitting an update to the database of the in-vehicle map, the update including the behavior and the persistence value.

14. The method of claim 13, further comprising:
retaining the update of the behavior in the database of the in-vehicle map if the persistence value is equal to or above a persistence value threshold; and
transmitting the update of the behavior to a map server during a time of high data connectivity.

15. The method of claim 13, further comprising:
dropping the update of the behavior if the persistence value is below a persistence value threshold and the in-vehicle map database is full.

16. The method of claim 15, further comprising:
determining the persistence value threshold based on the behavior.

17. The method of claim 13, further comprising:
updating the in-vehicle map with the behavior if the persistence value is below a persistence value threshold and above a persistence value of a previously stored update; and
dropping the previously stored update.

18. The method of claim 13, further comprising:
determining the confidence level threshold based on the behavior.

19. A non-transitory computer readable medium having instructions stored therein that, when executed by one or more processors, cause the one or more processors to perform a method for updating an in-vehicle map of a host vehicle, comprising:
receiving data streams from a plurality of external sensors of a host vehicle;
processing the data streams to monitor the activities of other vehicles;
determining whether the activities of the other vehicles deviate from map;
geo-fencing a map region in which the activities of the other vehicles deviate from the map;
receiving a data stream from the external sensors focused on the geo-fenced map region;
analyzing patterns of behavior of the activities of the other vehicles from the data stream;
determining a confidence level of the behavior based on a number of the other vehicles exhibiting the behavior, wherein the confidence level is directly proportional to the number of the other vehicles that exhibit the behavior; and
determining whether to update a database of the in-vehicle map with the behavior.

20. The non-transitory computer readable medium method of claim 19, comprising:
training an anomaly detector with datasets of known patterns of behavior;
applying the data stream from the external sensors focused on the geo-fenced map region to the anomaly detector;
outputting patterns of behavior of the data stream to a feature space of the anomaly detector;
matching the patterns of behavior of the data stream to a database of known patterns of behavior to identify the behavior;
comparing the confidence level of the behavior to a confidence level threshold;
continuing to monitor the activities of other vehicles if the confidence level is below the confidence level threshold;
outputting the confidence level of the behavior if the confidence level is equal to or above the confidence level threshold;
calculating a persistence value of the behavior when the confidence level is equal to or above the confidence level threshold;
transmitting an update to the database of the in-vehicle map, the update including the behavior and the persistence value;
retaining the update of the behavior in the database of the in-vehicle map if the persistence value is equal to or above a persistence value threshold and transmitting the update of the behavior to a map server during a time of high data connectivity;
dropping the update of the behavior if the persistence value is below a persistence value threshold and the in-vehicle map database is full; and
updating the in-vehicle map with the behavior if the persistence value is below a persistence value threshold and above a persistence value of a previously stored update and dropping the previously stored update.

* * * * *